(12) United States Patent
Jones et al.

(10) Patent No.: US 8,947,043 B2
(45) Date of Patent: Feb. 3, 2015

(54) LIGHT WITH INTEGRATED INDUCTIVE CHARGER BASE STATION

(75) Inventors: Neil Jones, Oakville (CA); Aaron Fung, Toronto (CA)

(73) Assignee: Teknion Limited, Toronto (CA)

( * ) Notice: Subject to any disclaimer, the term of this patent is extended or adjusted under 35 U.S.C. 154(b) by 924 days.

(21) Appl. No.: 13/115,521

(22) Filed: May 25, 2011

(65) Prior Publication Data

US 2012/0299539 A1 Nov. 29, 2012

(51) Int. Cl.
*H02J 7/00* (2006.01)
*H02J 7/02* (2006.01)

(52) U.S. Cl.
CPC ...................................... *H02J 7/025* (2013.01)
USPC ............................ 320/108; 320/109; 320/139

(58) Field of Classification Search
USPC ......................................................... 320/108
See application file for complete search history.

(56) References Cited

U.S. PATENT DOCUMENTS

| | | | |
|---|---|---|---|
| 2005/0127850 A1* | 6/2005 | Baarman et al. | 315/248 |
| 2010/0038970 A1* | 2/2010 | Cook et al. | 307/104 |
| 2010/0127660 A1* | 5/2010 | Cook et al. | 320/108 |
| 2010/0201201 A1* | 8/2010 | Mobarhan et al. | 307/104 |
| 2010/0219698 A1* | 9/2010 | Azancot et al. | 307/104 |
| 2010/0264873 A1* | 10/2010 | Li | 320/108 |
| 2011/0006611 A1* | 1/2011 | Baarman et al. | 307/104 |

* cited by examiner

*Primary Examiner* — Yalkew Fantu
(74) *Attorney, Agent, or Firm* — Bereskin & Parr LLP/S.E.N.C.R.L., s.r.l.

(57) ABSTRACT

A light comprises a lamp and an integrated inductive charger for coupling to a device having an inductive charger receiver connected thereto. The inductive charger receiver receives an electrical charge to charge a battery in the device. The lamp of the light provides illumination. The integrated inductive charger and the lamp are both electrically connected to a power supply. The integrated inductive charger can charge the battery in the device when the lamp is turned off. The lamp can be turned on without the integrated inductive charger providing an electrical charge. Alternatively, the integrated inductive charger can charge the battery in the device while the lamp is also turned on.

17 Claims, 9 Drawing Sheets

LIGHT WITH INTEGRATED INDUCTIVE CHARGER BASE STATION

FIELD

The invention relates to a light with an integrated inductive charger for coupling to a device having an inductive charging receiver connected thereto.

INTRODUCTION

Inductive charging (also referred to as wireless charging) is becoming a popular way to charge battery-powered devices, such as mobile phones and other mobile electronic devices.

SUMMARY OF THE INVENTION

The embodiments described herein provide in one aspect, a light with an integrated inductive charger for coupling to a device having an inductive charging receiver connected thereto for receiving an electrical charge to at least one battery in the device, the light comprising:
 an inductive charger base station comprising a charging coil;
 a housing for securing the charger base station therein, the housing comprising a container for receiving the charger base station; and a housing cover comprising a planar contact surface adapted for placement of the charging receiver thereon, wherein the charging coil is located beneath the contact surface;
 a light base comprising a bottom portion and a base cover, the base cover having a substantially planar outer surface, wherein the planar outer surface defines an opening therein, wherein the bottom portion and the base cover define an interior volume, wherein the housing is located in the interior volume, wherein the contact surface is located in the opening, wherein the contact surface is flush with the outer surface of the base cover of the light base;
 a lamp; and
 a power supply; wherein the lamp and the inductive charger base station are electrically connected to the power supply, wherein the power supply powers the lamp and the inductive charger base station.

The embodiments described herein provide in another aspect, a light base assembly with an integrated inductive charger for coupling to a device having an inductive charging receiver connected thereto for receiving an electrical charge to at least one battery in the device, the light base comprising:
 an inductive charger base station comprising a charging coil;
 a housing for securing the charger base station therein, the housing comprising a container for receiving the charger base station and a housing cover comprising a planar contact surface adapted for placement of the charging receiver thereon, wherein the charging coil is located beneath the contact surface;
 a bottom portion and a base cover, the base cover having a substantially planar outer surface, the planar outer surface defines an opening therein, wherein the bottom portion and the base cover define an interior volume, wherein the housing is located within the interior volume, wherein the contact surface is located in the opening, wherein the contact surface is flush with the outer surface of the base cover.

BRIEF DESCRIPTION OF THE DRAWINGS

For a better understanding of embodiments of the assembly described herein, and to show more clearly how they may be carried into effect, reference will be made, by way of example, to the accompanying drawings in which.

DESCRIPTION OF VARIOUS EMBODIMENTS

Various apparatuses or processes will be described below to provide an example of each claimed invention. No example described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Applicant reserves the right to claim such apparatuses or processes in other applications.

Figure 1:
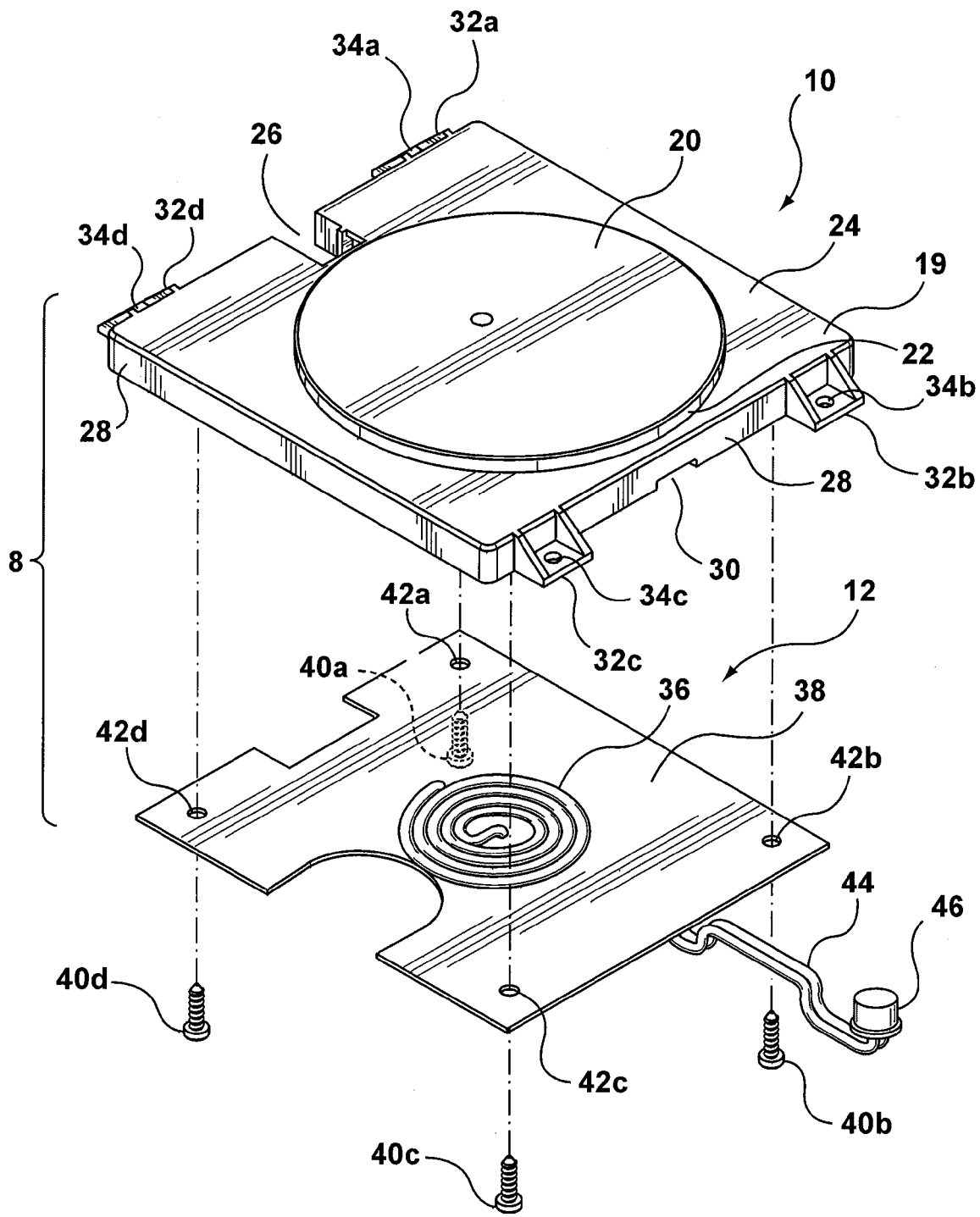
FIG. 1 is an exploded perspective view of a portion of a charger base assembly.
Figure 7:
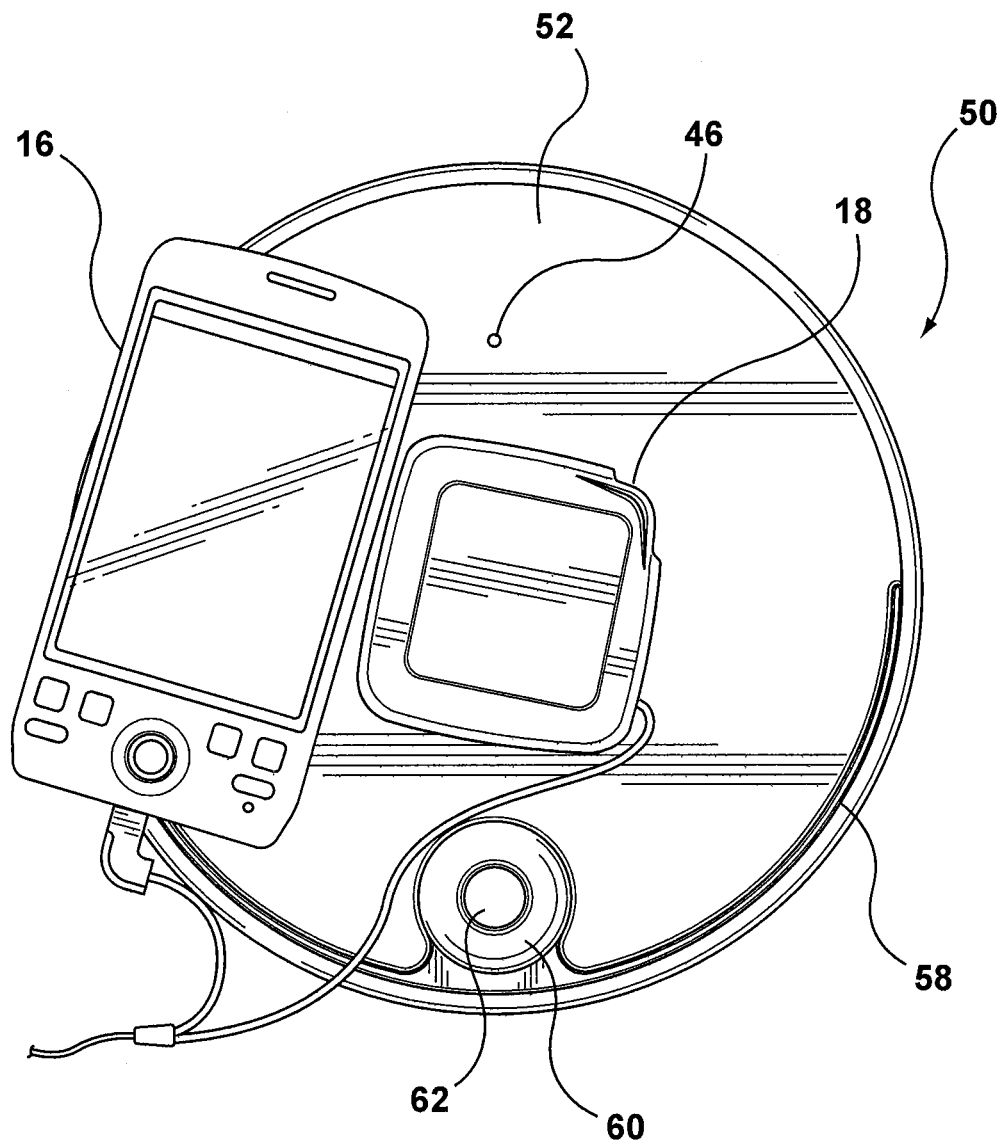
FIG. 7 is a top view of the device having an inductive charging receiver connected thereto placed in the vicinity of the light base.
Figure 8:
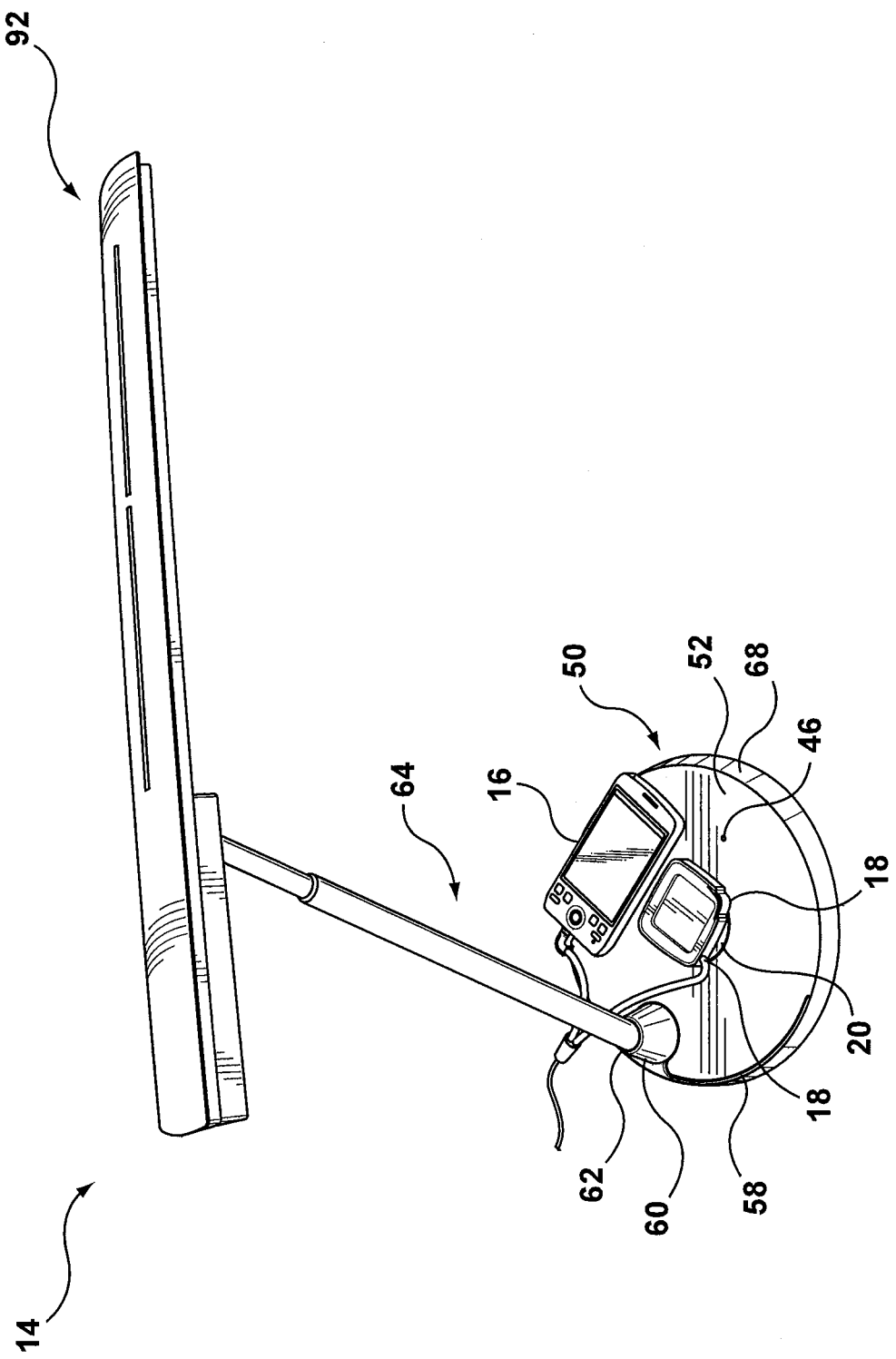
FIG. 8 is a perspective view of the light and a device having an inductive charging receiver connected thereto placed in the vicinity of the light base.

FIG. 1 shows charging base assembly 8, which includes a housing 10 for mounting an inductive charger base station 12 to a light 14, shown in FIG. 8. The inductive charger base station 12 charges a device 16 (such as, for example, a mobile phone, smart phone, or other mobile computing device) which is equipped with an inductive charging receiver 18, shown in FIGS. 7 and 8. The charger base station 12 and inductive charging receiver 18 are commercially available, for example, from Powermat USA, LLC. The inductive charger, which is integrated within the light 14 couples to the device 16 having the inductive charging receiver 18 connected thereto for receiving an electrical charge to at least one battery in the device 16.

Referring back to FIG. 1, the housing 10 comprises a housing cover 19, which includes a planar contact surface 20 on which the inductive charging receiver 18 is placed. Preferably, the planar contact surface 20 is a circular surface. A shoulder 22 extends vertically from the outer circumference of the planar contact surface 20. The housing 10 also includes a lower planar surface 24, which extends horizontally from the lower circumference of the shoulder 22. The lower planar surface comprises a horizontal gap 26 for accommodating connectors for connecting the inductive charger base station 12 to other electrical components, such as a power supply. Vertical walls 28 extend vertically from an outer perimeter of the lower planar surface 24. One of the vertical walls 28 comprises a wall gap 30. The vertical walls 28 further comprise horizontal protrusions 32a-d, each horizontal protrusion comprising first holes 34a-d for accommodating fasteners. As used herein, the planar contact surface 20 defines a preferably horizontal plane and vertically means a direction orthogonal to the horizontal plane.

The planar contact surface 20, shoulder 22, and the plane defined by the lower planar surface 24 define a first interior volume in which a charging coil 36 of the inductive charger base station 12 is received. The lower planar surface 24, and vertical walls 28 define a second interior volume in which a circuit board 38 of the inductive charger base station 12 is received. Preferably, the inductive charger base station 12 is secured to the underside of housing 10 by first threaded fasteners 40a-d which pass through corresponding second holes 42a-d in the circuit board 38 of the inductive charger base station 12 and are secured within first internally threaded posts (not shown) preferably integrally molded to the underside of the lower planar surface 20 of the housing 10. When the inductive charger base station 12 is secured to the housing 10, the charging coil 36 of the inductive charger base station 12 preferably abuts against the underside of the planar contact surface 20 inside the first interior volume and the circuit board 38 preferably abuts against the underside of the lower planar surface 24 inside the second interior volume. The circuit board 38 comprises a cutaway portion 41, which may be semi-circular, to accommodate a loudspeaker 47 when the charger base station 12 is secured to the housing 10.

Figure 2:
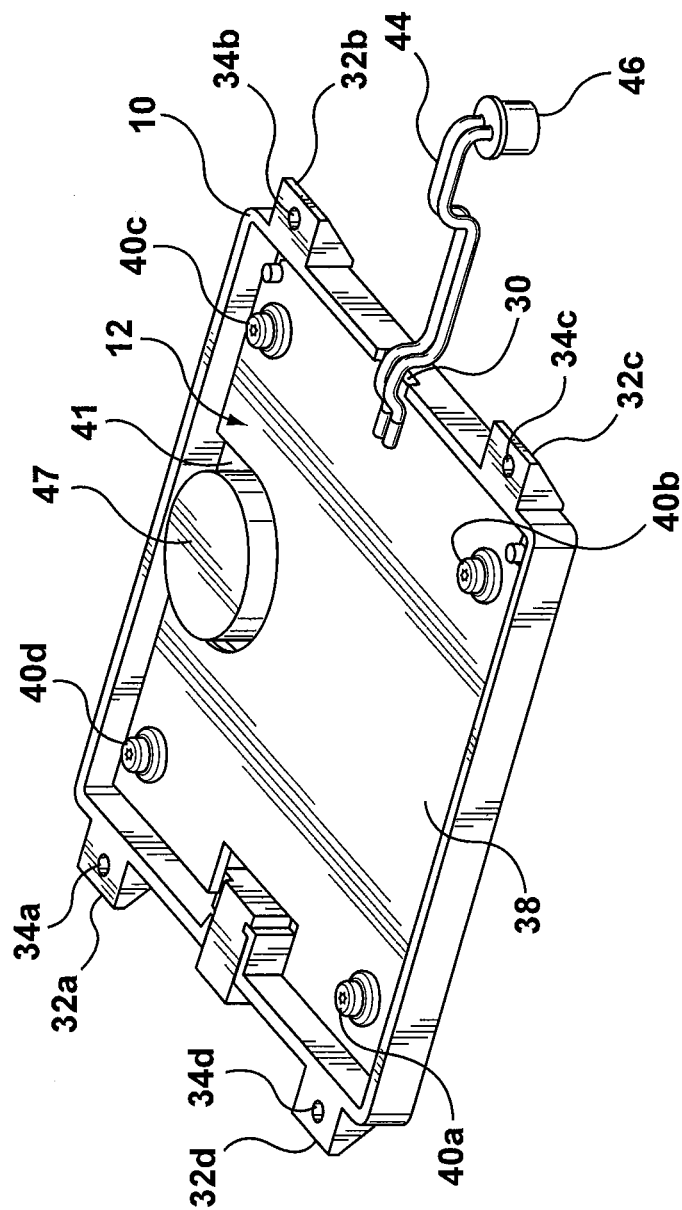
FIG. 2 is a perspective view of a charger station secured to a charger housing.

Referring to FIG. 2, therein shown is a bottom view of the housing 10 and inductive charger base station 12 assembled together, wherein threaded fasteners 40a-d secure the inductive charger base station 12 to the housing 10. LED connecting wires 44 projects through the wall gap 30 of one of the vertical walls 28 to connect the inductive charger base station 12 to a indicator light-emitting diode (LED) 46. The indicator LED 46 may illuminate when charging of the device 16 using charging coil 36 of the inductive charger base station 12 has been detected. The underside of the loudspeaker 47 is shown to project through the cutaway portion 41 of the circuit board 38. The loudspeaker 47 may be any typical electroacoustic transducer known in the art and is connected to the inductive charger base station 12. The loudspeaker 47 is configured to emit an audible chime when charging of the device 16 using the charging coil 36 of the inductive charger base station 12 has been detected. The indicator LED 46 being illuminated and/or the loudspeaker 47 emitting an audible chime notifies a user that the inductive charging receiver 18 has been properly aligned with the charging coil 36 to receive an electrical charge therefrom.

Figure 3:
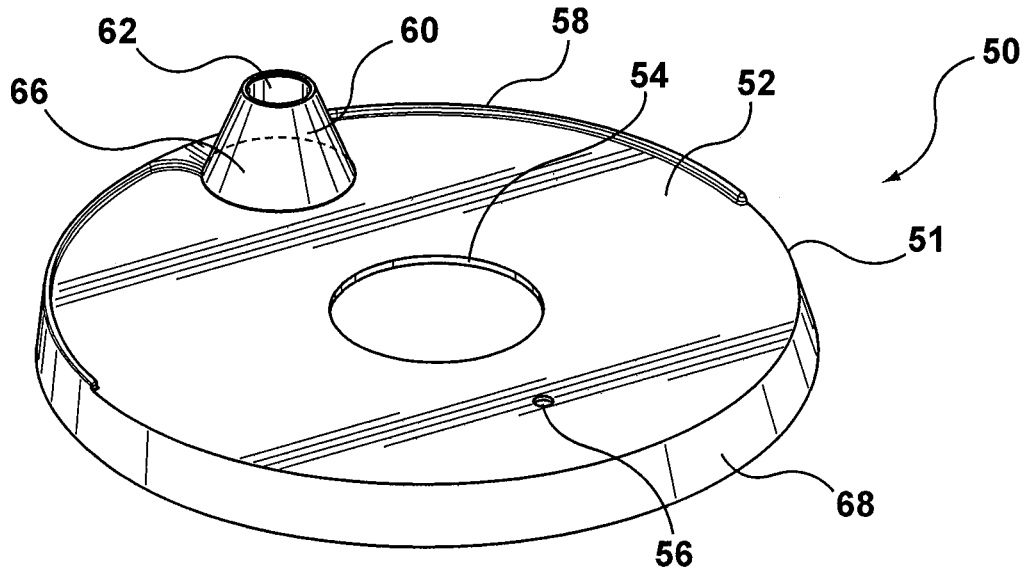
FIG. 3 is a perspective view of a lamp base.
Figure 4:
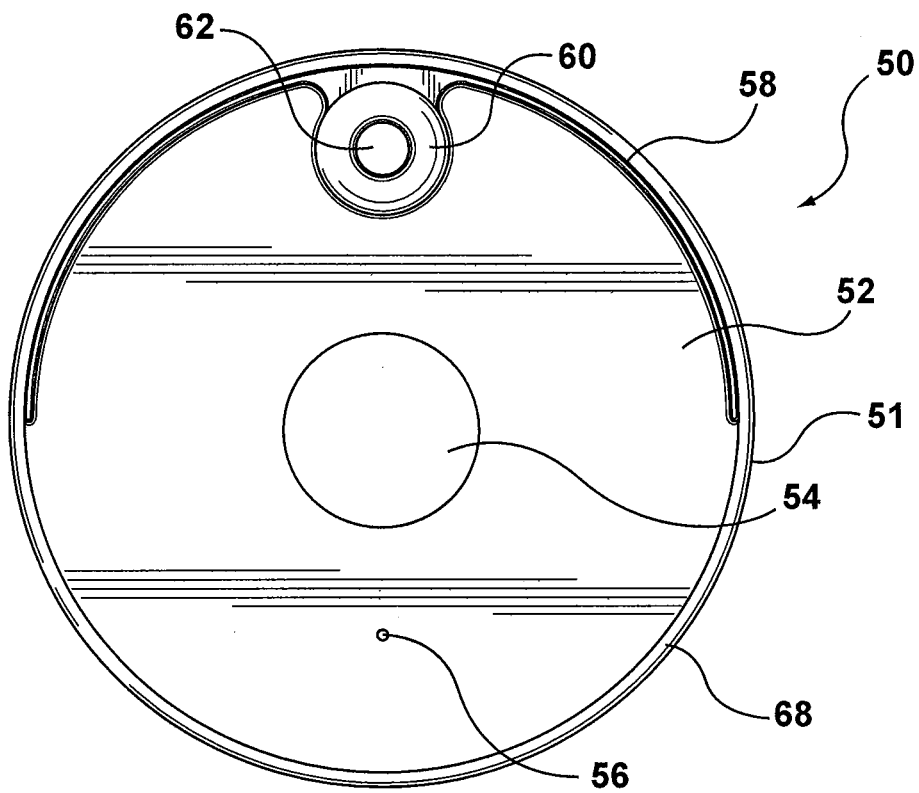
FIG. 4 is a top view of the lamp base.

Referring to FIG. 3, therein shown is a light base 50 of the light 14. The light base includes a cover 51, which includes a planar outer surface 52 being substantially planar. Preferably, the planar outer surface 52 is a circular surface. The planar outer surface 52 defines a first opening 54 to accommodate the planar contact surface 20 of the housing 10. The first opening 54 is preferably sized so that the edges of the first opening 54 snugly surround the planar contact surface 20. The planar outer surface 52 further defines a second opening 56 to accommodate the indicator LED 46. The base cover 51 may further include a rib 58 which extend vertically over a portion of the outer circumference of the planar outer surface 52 to provide an aesthetically pleasing feature. An arm base 60 extends vertically from the base cover 51. The arm base 60 may have a slight downward taper to provide an aesthetically pleasing feature. The arm base 60 also includes arm base opening 62 to accommodate light arm 64 (shown in FIG. 8) and wires connecting one or more electrical components of the light 14. A third opening 66 defined by the planar outer surface 52 accommodates the arm base 60, light arm 64 and wires connecting one or more electrical components of the light 14. The base cover 51 also includes a base shoulder 68 extending vertically downwardly from the outer circumferences of the planar outer surface 52. The base shoulder 68 may also be slightly tapered to provide an aesthetically pleasing feature. FIG. 4 shows a top view of the light base 50.

Figure 5:
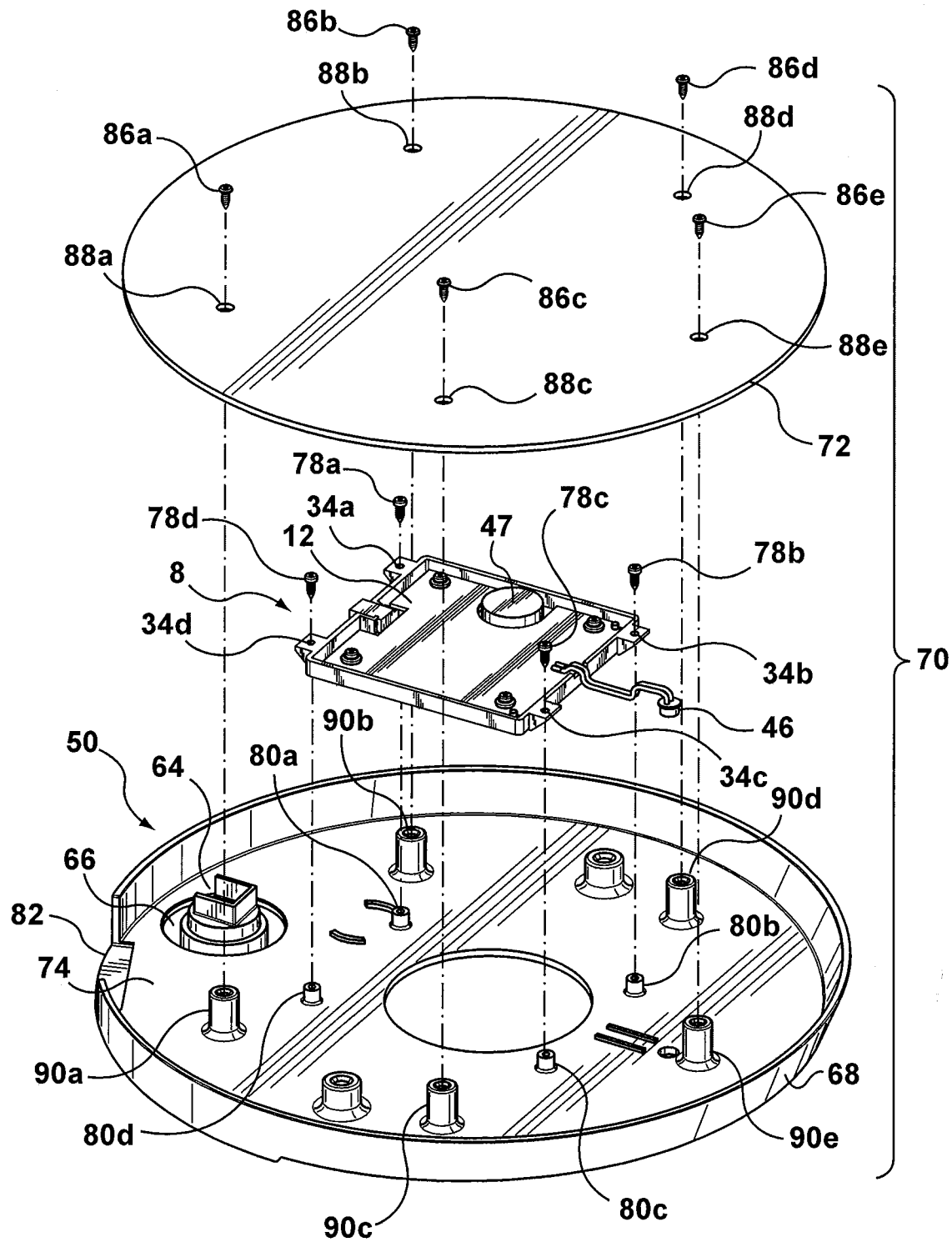
FIG. 5 is an exploded perspective view of the light base assembly.

Referring now to FIG. 5, therein shown is an exploded view of the light base assembly 70 comprising a bottom portion 72, housing assembly 8, and light base 50. The planar outer surface 52, base shoulder 68 and bottom portion 72 define a base interior volume 74 in which the housing 10 and inductive charger base station 12 of the housing assembly 8 are located. The housing 10, having already the inductive charger base station 12 secured to it, is itself secured to the underside of the planar outer surface 52 of the base cover 51 of the light base 50 by second threaded fasteners 78a-d which pass through first holes 34a-d in the horizontal protrusions 32a-d and are secured within second internally threaded posts 80a-d preferably integrally molded to the underside of the planar outer surface of the base cover 51. When the housing 10 is secured to the base cover 51, the lower planar surface 24 preferably abuts against the underside of the planar outer surface 52 inside the base interior volume 74. Furthermore, when the housing 10 is secured to the base cover 51, a protruding portion defined by the planar contact surface 20 and shoulder 22 is inserted into the first opening 54 in the planar outer surface, such that the outer circumference of the planar contact surface 20 rests on the planar outer surface 52 around the inner circumference of the first opening 54, creating the appearance that the planar contact surface 20 is substantially flush with the planar outer surface 52. A distal end of the light arm 64 is shown to project through the third opening 66 of the base cover 51. Further connecting wires may also project through third opening of the base cover 51 to connect various components of the light 14.

The base shoulder 68 may include a gap 82 to accommodate power connecting wires for connecting the electrical components to an external power source, which may be a typical 110V-240V alternating current (AC) electric source, or any other type of suitable external power source. Alternatively, the power connecting wires may project through an opening (not shown) in the bottom portion 72 to connect the electrical components to an external power source.

The bottom portion 72 is sized to abut against the edges of the base shoulder 68 such that the light base 50 and bottom portion 72 substantially enclose components located within the base interior volume 74 when the bottom portion 72 is secured to the base cover 51. Bottom portion 72 is secured to the base cover 51 by third threaded fasteners 86a-e which pass through corresponding third holes 88a-e of the bottom portion 72 and are secured within third internally threaded posts 90a-e preferably integrally molded to the underside of the base planar surface 52 of the base cover 51.

Figure 6:
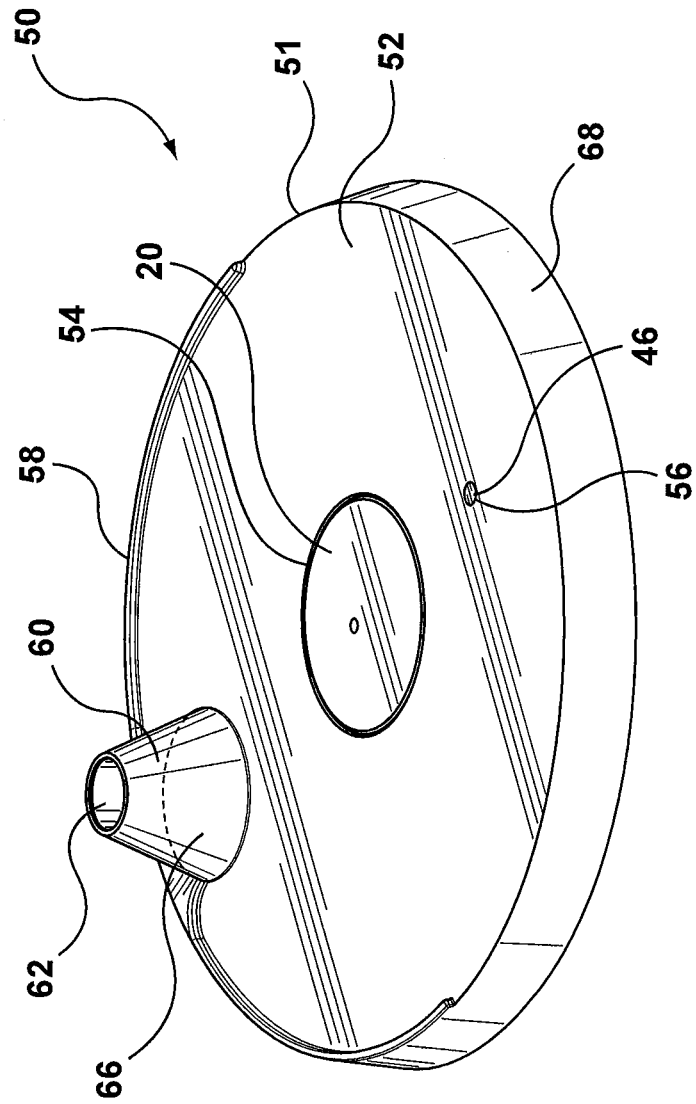
FIG. 6 is a perspective view of the charger base assembly secured to the light base assembly.

Referring now to FIG. 6, therein shown is perspective view of the light base 50 wherein the housing 10 and inductive charger base station 12 have been secured to the underside of the planar outer surface 52 of the base cover 51. The planar contact surface 20 having a circular surface and shoulder 22 is shown to be inserted into the first opening 54 also having a circular circumference such that the planar contact surface 20 is substantially flush with the planar outer surface 52. Furthermore, indicator LED 46 is shown to be inserted into the second opening 56. Preferably the LED has a planar top surface having a circumference that is substantially the same as the inner circumference of the second opening 56.

Referring to FIG. 7, therein shown is an assembled light base 50 of the light 14, wherein a device 16 connected to the inductive charging receiver 18 is placed in the vicinity of the light base 50 in order to charge the device 16. The inductive charging receiver 18 is placed directly over the planar contact surface 20 such that it is inductively coupled to the charging coil 36 of the inductive charger base station 12 to receive energy transferred electromagnetically. In an alternative embodiment (not shown), the inductive charging receiver may be built-in to the device 16 or a part of the device, such as a battery cover. In such case, the device, itself, is placed directly on the contact surface 20.

Referring to FIG. 8, therein shown is the light 14, which includes the light base 50, light arm 64 and lamp head 92. The light arm 64 is attached to arm base 60 at a distal end and attached to the lamp head 92 at a proximal end. The light arm 64 is preferably hollow to accommodate electrical wires projecting through the arm base opening 62 connecting electrical components located in the light arm 64, lamp head 92 and light base 50. Device 16 and inductive charging receiver 18 are shown to be placed in the vicinity of the light base 50 in order to charge the device 16. The inductive charging receiver 18 is placed directly over the planar contact surface 20 such that it is inductively coupled to the charging coil 36 of the inductive charger base station 12 to receive energy transferred electromagnetically.

The lamp head 92 receives a lamp, which may comprise one or more lighting devices for producing illumination. The lamp may comprise light devices selected from: compact fluorescent lamps, halogen light bulbs, neon light bulbs, light emitting diodes, fluorescent light bulbs or other known types of lamps. Preferably, the one or more lighting devices is one or more light emitting diodes. In this case, the lamp head 92 may further include other components for accommodating use of light emitting diodes such as one or more heat sinks and light diffusers.

The light 14 is shown in FIG. 8 to be a typical task light or desk light to be placed upon a work surface such as a desk top. However, it will be appreciated that light 14 may have other embodiments, such as a floor light, wall light, or under cabinet light. Furthermore, in some cases, such as the wall light and under cabinet light, the light 14 does not include a light arm 64 for attaching the lamp head 92 to the light base 50. In these cases, the lamp head 92 may be fixed to a ceiling or a wall. For example, the lamp head 92 may be fixed against a wall or underside of a cabinet, and the light base 50 placed on a flat surface such as a counter-top, while electrical wires connecting electrical components of the light 14, in particular in the light base 50 and lamp head 92, are hidden from view, for example, behind a wall.

Figure 9:
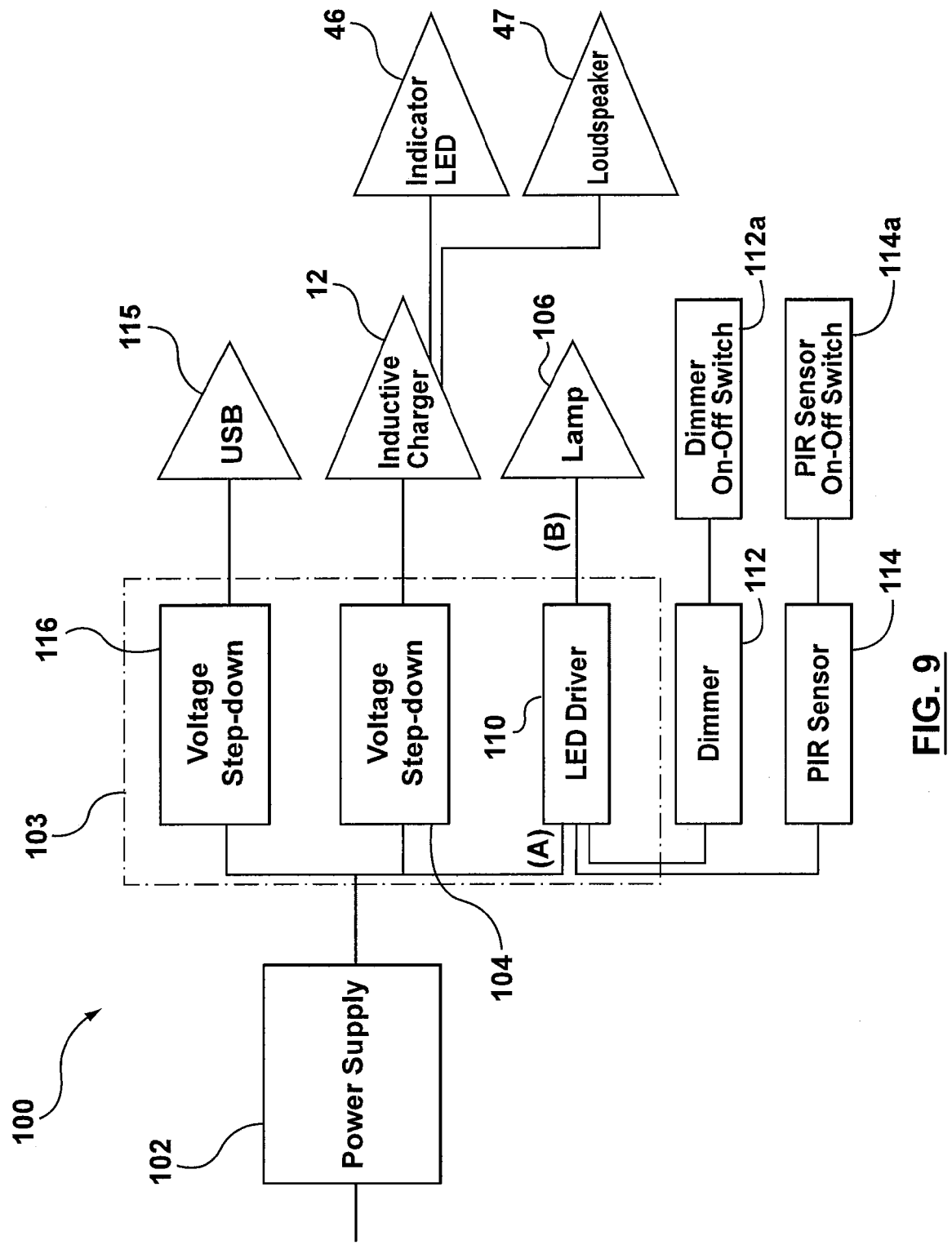
FIG. 9 is a schematic circuit diagram of electrical components of the light.

Referring to FIG. 9, therein illustrated is a schematic circuit diagram 100 of the electrical components of the light 14 for supplying appropriate power to the inductive charger base station 12 and the one or more lighting devices of the lamp head 92. A power supply 102 receives power from an external source, such as a typical 110-240V AC, and outputs direct current (DC) power. To convert AC power to DC power, the power supply 102 may be a typical rectifier that converts AC power to DC power and outputs electrical power at a fixed voltage. Power outputted from the power supply 102 is received by a power distribution circuit 103, which then supplies appropriate power individually to the inductive charger base station 12, one or more lighting devices of the lamp head 92, and other components requiring electricity. However, it should be understood that the type of external source is not limited to AC power and that other types of external sources may be used. For example the external source may provide DC power, in which case the power supply 102 may be a DC power to DC power converter. Alternatively, solar light may be used, in which case the power supply 102 may comprise suitable solar panels with an energy storage device such as a battery.

The power distribution circuit 103 supplies power to the inductive charger base station 12 at an appropriate voltage. Where the voltage of the electrical power supplied by the power supply 102 matches the rated voltage of the inductive charger base station 12, the power supply 102 may be directly connected to the inductive charger base station 12. However, where the rated voltage of the inductive charger base station 12 is different from the voltage of the power supplied by the power supply 102, a first voltage step-down converter 104 connects the power supply 102 to the inductive charger base station 12. For example, a typical rectifier of the power supply 102 may provide DC power at 24 Volts but an inductive charger base station from Powermat USA LLC is rated at 18 Volts, in which case the first voltage step-down converter 104 steps down voltage from 24 Volts to 18 Volts such that power is supplied to the inductive charger base station 12 at its rated voltage. Power fed to the inductive charger may also be used to power the indicator LED 46 and/or loudspeaker 47.

The power distribution circuit 103 also supplies power to the one or more lighting devices of the lamp head 92, denoted as lamp 106 in FIG. 9. A switching circuit may connect the power supply 102 to the lamp 106 to allow a user to turn on or turn off the lamp 106 by selecting whether or not power is to be supplied to the lamp 106. In cases where the lamp 106 is rated for a specific voltage or range of voltages, a second voltage step-down connects the switching circuit to the lamp 106 to supply power to the lamp 106 at the appropriate voltage.

Figure 10:
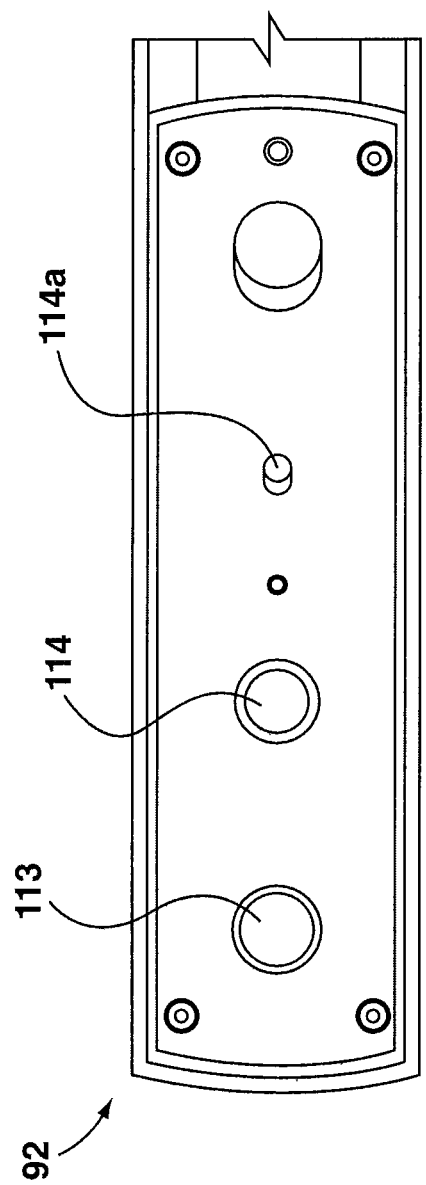
FIG. 10 is a bottom view of the lamp head of the light.

In the preferred embodiment, the lamp 106 consists of one or more LEDs. According to this embodiment, an LED driver 110 connects the power supply 102 to the LEDs of the lamp 106 to supply power at an appropriate current and with an appropriate duty cycle. As used herein, duty cycle refers to the duration of time current is fed from the LED driver 110 per fixed time period. The duty cycle controls the intensity of light produced from the LEDs of the lamp 106. Where the LED driver 110 is configured appropriately, a dimmer circuit 112 may optionally be connected to a feedback input for controlling the current and the duty cycle of the current fed by the LED driver 110 to the LEDs of lamp 106, thereby also controlling the intensity of light emitted from the LEDs of lamp 106. The dimmer circuit 112 is connected to a dimmer control, which may be a knob or slider operable by a user by sliding the slider or turning the knob to control the intensity of the light emitted from LEDs. The dimmer circuit 112 may comprise, or be connected to, a dimmer on-off switch 112a, which controls whether power is fed by the LED driver 110 to the lamp 106 to turn on or turn off the lamp 106. The dimmer on-off switch 112a may be operated by a physical switch. Alternatively, the dimmer on-off switch 112a may be integrated within the physical dimmer control. For example the dimmer on-off switch 112a is switched off when the slider is slid to one extremity or when the knob is turned to one extremity of its full turning motion. The dimmer control operating the dimmer circuit 112 may be placed at any appropriate location of the light 14 such as in the light base 50, light arm 64 or lamp head 90. Referring now to FIG. 10, illustrating a bottom view of the underside the lamp head 90, the dimmer control is shown to be a knob 113 that is located on the underside of the lamp head 90.

Referring back to FIG. 9, a passive infrared (PIR) sensor 114 may be further connected to the LED driver 110. The PIR sensor 114 is operable to detect the presence of a human user in the vicinity of the light 14. Preferably, the PIR sensor 114 is a pyroelectric infrared sensor for detecting infrared sources having certain temperatures in the vicinity of the sensor and within its field of view. One infrared source with a specific temperature is the body heat emitted from a human user. In this case, the PIR sensor 114 detects the presence of a user in the vicinity of the light 14 by detecting a body heat source placed near the light 14. The PIR sensor 114 is adapted to selectively and automatically turn on and turn off the lamp 106 based on the detected presence of the user in the vicinity of the light 14 by controlling whether power is fed by the LED driver to the lamp 106. For example, a user can automatically turn on the lamp by simply being near the light 14 such that the user's presence is detected by the PIR sensor 114 and power is fed by the LED driver 110 to the lamp 106. Similarly, when a user is no longer near the light 14 such that the user's presence is no longer detected by the PIR sensor 114, the lamp 106 is automatically turned off by causing the LED driver 110 to cease supplying power to the lamp 106. Preferably, the PIR sensor 114 is configured to turn off the lamp only if the presence of the user is not detected for a specified continuous duration of time. For example, the PIR sensor may be configured to automatically turn off the lamp only if no user presence is detected for a continuous duration of 20 minutes. In this way, the user can turn on and turn off the lamp without physically touching any part of the light. This method of automatically operating the lamp 106 of the light 14 provides ease-of-use and an additional "cool" factor.

The PIR sensor 114 may further comprise, or be connected to, a PIR sensor on-off switch 114a, as shown in FIG. 10, to allow both user motion-detected turning on-off and for manually turning on-off the lamp 106. For example, the PIR sensor may be operated to turn on the lamp 106 by causing the LED driver 110 to feed power to the lamp 106 only when the PIR sensor on-off switch 114a is set to on. If the PIR sensor on-off switch 114a is set to off, no power is fed by the LED driver to the lamp 106. Manually turning off using the PIR sensor on-off switch 114a may be desirable, for example, to avoid inadvertent turning on of the lamp 106 when the user is away from the light 14, such as by a pet or a young child being in the vicinity of the PIR sensor 114.

The PIR sensor 114 may be placed at any suitable location of the light 14 to allow a user's presence to be easily detected by the PIR sensor 114 in order to turn on or turn off the lamp 106 of the light 14. For example, the PIR sensor 114 may be placed on the lamp head 92, along the light arm 64 or within the light base 50, Preferably the PIR sensor 114 and the PIR sensor on-off switch 114a are located on the underside of the lamp head 92, as shown in FIG. 10. When located in this way, the PIR sensor 114 is operable to detect the presence of a user within a zone defined by a volume projecting conically downwards from the PIR sensor 114 towards the light base 50, wherein the PIR sensor 114 is the apex of the conical volume. In one embodiment, the PIR sensor 114 is selected such that its angle of view is approximately 150°.

As the lamp 106 is connected in parallel with the inductive charger base station 12 in the power distribution circuit 103, the turning on and turning off of the lamp 106 does not affect the power being supplied to the inductive charger base station 12. Notably, when lamp 106 is turned off and no power is supplied to the lamp 106, power may still be supplied to the inductive charger base station 12. This may be useful where the user does not want to turn on the lamp 106 but still wants to charge the device 16 by coupling the inductive charger base station 12 to the device 16 having an inductive charging receiver 18 connected thereto. Similarly, the lamp 106 may be activated to provide illumination without power being delivered to the inductive charger base station 12. The power distribution circuit 103 therefore provides flexibility in the way a user can utilize the light 14.

Referring again to FIG. 9, the light 14 may optionally include a universal serial bus (USB) terminal 115 for charging a device 16 that is connected to the USB terminal 115. In this case, the power distribution circuit 103 further comprises a third voltage step-down converter 116, which connects the power supply 102 to the USB terminal 115 in parallel with the connection to the inductive charger base station 12 and the lamp 106. As the USB terminal 115 is rated to operate at 5 Volts DC, the second voltage step-down converter 116 steps down the power supplied from the power supply 102 to 5 Volts DC when feeding power to the USB terminal 115. Furthermore, as the second voltage step-down 116 connects the power supply 102 to the USB terminal 115 in parallel with the inductive charger base station 12 and the lamp 106, the USB terminal 115 may receive power independently of the supply of power to the inductive charger base station 12 and/or the lamp 106.

While the components of the schematic circuit diagram 100 are shown to be closely connected, it will be appreciated that the components may be physically located at various locations within the light 14. For example, the power supply 102 comprising the rectifier may be located inside the base interior volume 74 and connected to the external power source through power connecting wires 84 projecting through the shoulder gap 82. Alternatively, the power supply 102 may be located within an electrical box separate of the light base 50, the output of the supply 102 being connected to the power distribution circuit 76 via the power connecting wires 84. Similarly, the sub-components of the power distribution circuit 76 may be physically located at various locations within the light 14. For example, all the components may be located together within the base interior volume 74. Alternatively, and preferably where the lamp 106 is one or more LEDs, the LED driver 110 is placed in the lamp head 92. Furthermore, some of the electrical components shown in the schematic circuit diagram 100 may be connected using physical electrical wires while subsets of the components may be implemented on a printed circuit board and connected using electrical lines drawn on the printed circuit board.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

We claim:

1. A light with an integrated inductive charger for coupling to a device having an inductive charging receiver connected thereto for receiving an electrical charge to at least one battery in the device, the light comprising:
   a. an inductive charger base station comprising a charging coil;
   b. a housing for securing the charger base station therein, the housing comprising:
      i. a container for receiving the charger base station; and
      ii. a housing cover comprising a planar contact surface adapted for placement of the charging receiver thereon, wherein the charging coil is located beneath the contact surface;
   c. a light base comprising a bottom portion and a base cover, the base cover having a substantially planar outer surface, wherein the planar outer surface defines an opening therein, wherein the bottom portion and the base cover define an interior volume, wherein the housing is located in the interior volume, wherein the contact surface is located in the opening, wherein the contact surface is flush with the outer surface of the base cover of the light base;

d. a lamp;

e. a power supply; wherein the lamp and the inductive charger base station are electrically connected to the power supply, wherein the power supply powers the lamp and the inductive charger base station; and f. a step-down voltage converter, wherein the step-down voltage converter connects the power supply to the inductive charger base station to power the inductive charger base station at a predetermined rated voltage.

2. The light of claim 1, wherein the planar outer surface defines a second opening therein, wherein an indicator light is located in the second opening to indicate charging of the device.

3. The light of claim 1, wherein the light base further comprises an arm base extending from the planar outer surface of the cover; and the light further comprises a hollow light arm and a lamp head receiving the lamp, wherein a proximate end of the light arm is connected to the arm base and a distal end of the light arm is connected to the lamp head.

4. The light of claim 1 wherein the light further comprises a lamp head adapted to be secured to a wall or ceiling, wherein the lamp head is adapted for receiving the lamp.

5. The light of claim 1, wherein the power supply is a rectifier.

6. The light of claim 1, wherein the lamp comprises one or more light emitting diodes; and wherein an LED driver connects the power supply to the lamp in parallel with the inductive charger base station to supply current to the one or more light-emitting diodes at a predetermined duty cycle and a predetermined current level.

7. The light of claim 6, wherein the power supply is a rectifier.

8. The light of claim 6, further comprising a dimmer connected to the LED driver for controlling the duty cycle and the current level of the current supplied to the lamp.

9. The light of claim 8, wherein the dimmer is connected to the feedback input of the LED driver.

10. The light of claim 8, wherein the dimmer further comprises a first on-off switch operable to selectively control the LED driver to turn on and turn off the supply of current to the lamp.

11. The light of claim 6, wherein a passive infrared sensor is connected to the LED driver, the sensor adapted for detecting a presence of a user in the vicinity of the light to selectively control the LED driver to turn on and turn off the supply of current to the lamp.

12. The light of claim 11, wherein the passive infrared sensor is a pyroelectric infrared sensor.

13. The light of claim 11, wherein the passive infrared sensor further comprises a second on-off switch, wherein the passive infrared sensor operates to selectively turn on the lamp only if the second on-off switch is switched on.

14. The light of claim 11, wherein the passive infrared sensor is located on an underside of the lamp head.

15. The light of claim 1, wherein the light further comprises:

a. a universal serial bus terminal for charging the device through the terminal; and b. a second step-down voltage converter connecting the power supply to the terminal in parallel with the charger base station and the lamp to power the terminal at a predetermined rated voltage.

16. A light base assembly with an integrated inductive charger for coupling to a device having an inductive charging receiver connected thereto for receiving an electrical charge to at least one battery in the device, the light base comprising:

a. an inductive charger base station comprising a charging coil;

b. a housing for securing the charger base station therein, the housing comprising:

i. a container for receiving the charger base station; and ii. a housing cover comprising a planar contact surface adapted for placement of the charging receiver thereon, wherein the charging coil is located beneath the contact surface;

c. a bottom portion and a base cover, the base cover having a substantially planar outer surface, the planar outer surface defines an opening therein, wherein the bottom portion and the base cover define an interior volume, wherein the housing is located within the interior volume, wherein the contact surface is located in the opening, wherein the contact surface is flush with the outer surface of the base cover;

d. a power supply, wherein the inductive charger base station is electrically connected to the power supply, wherein the power supply powers the inductive charger base station; and e. a step-down voltage converter, wherein the step-down voltage converter connects the power supply to the inductive charier base station to power the inductive charger base station at a predetermined rated voltage.

17. The light base assembly of claim 16, wherein the planar outer surface defines a second opening therein, wherein an indicator light is located in the second opening to indicate charging of the device.

* * * * *